Patented Oct. 19, 1937

2,095,967

UNITED STATES PATENT OFFICE 2,095,967

SEPARATION OF MOLYBDENITE FROM COPPER SULPHIDES

Earl Henry Brown, Palo Alto, Calif., assignor to Minerals Separation North American Corporation, New York, N. Y., a corporation of Maryland No Drawing. Application October 12, 1936, Serial No. 105,235

13 Claims. (Cl. 209—167)

The present invention relates in general to ore concentration by flotation, and more particularly to the separation of molybdenite (molybdenum sulphide) from copper sulphides by selective flotation of the copper sulphides.

According to the invention, this separation is effected by agitating a pulp of the material containing the molybdenite and copper sulphides, in the presence of a substance acting to depress the molybdenite, other agents being also present in the pulp to effect flotation of the copper sulphides. By the use of the molybdenite depressant, flotation of the molybdenite is only temporarily inhibited. That is, the molybdenite remains in the pulp in such state that its subsequent flotation, if desired, may be readily carried out.

The basis of the invention is the discovery that dyes employed in relatively small quantities have the effect of inhibiting flotation of molybdenite while not preventing flotation of copper sulphides, so that the latter may be removed in the usual way as a flotation concentrate containing only a small amount of molybdenite. Moreover, an important advantage of the invention resides in the fact that the differential inhibiting action provided by the dye takes place with respect to each of the copper sulphides which may be present in the material treated, so that they may be all successfully floated away from the molybdenite. In this manner it has been found that high recovery of molybdenite may also be obtained.

Any organic substance used in commerce as a dye may be used to selectively inhibit flotation of the molybdenite. Successful tests have thus been carried out with eosin bluish (a pyrone derivative), eosin yellowish (a pyrone derivative), Congo red (an azo dye), picric acid (a nitro dye), acid fuchsin (a triphenyl methane derivative), methylene blue (a thiazine derivative), a methyl eosin (a pyrone derivative), aniline blue (a triphenyl methane derivative), induline blue (an azine derivative), Erie black (an azo dye), Wool green S (a triphenyl methane derivative), acid green (a triphenyl methane derivative), acid orange, Hoffman violet (a triphenyl methane derivative), acid blue (a triphenyl methane derivative), acid orange A, indigotine (an indigo dye), chrysoidine (an azo dye), etc. These substances are of course not all equally effective, but a more or less complete separation of molybdenite may nevertheless be obtained with each.

In carrying out the invention, it may be desirable in certain cases to produce a primary concentrate of molybdenite and copper sulphides, and in these cases the dye is added to that concentrate, during its retreatment prior to actual flotation of the copper sulphides. If the primary concentrate is of high grade, it may be unnecessary to float the molybdenite. That is, the copper sulphides are floated and removed, and the tailings resulting from this flotation themselves constitute a molybdenum concentrate.

Where the copper sulphides are to be directly floated away from both gangue and molybdenite, the dye is of course added to the crude ore, as during its conditioning preparatory to flotation of the copper sulphides.

Whereas with some dyes the step of floating the copper sulphides away from the molybdenite may be carried out in either alkaline, neutral, or acid pulps, it is nevertheless often required that the dye be used within certain pH limits to render it effective. In practice, therefore, each dye should have the range of pH values, under which it is effective or most effective, ascertained prior to use, simple experimental tests being necessary for this purpose. The pH value of the pulp can be controlled by the usual methods found effective in flotation, sulphuric acid or some other acid being used to lower the pH value and the common alkalies to raise it. Lime is preferred, however, as a substance to produce alkalinity, and may be added to the ore during a preliminary grinding operation to a fine particle size. The use of lime has been found to result in a certain depressing effect on the molybdenite. This substance thus enhances the effect of the dye, so that a reduced quantity of the dye is made possible.

The various dyes differ considerably in effect, and consequently the quantities in which they should be employed differ accordingly, though they are always small. The quantity of dye which is required in each individual case is also capable of determination by simple experiment.

For floating the copper sulphides, flotation agents known in the art may be used in association with the dye. Cresylic acid may thus be used as a frother, and collectors of the type of xanthates, aerofloats, etc., may be employed with satisfactory results.

Flotation of the molybdenite may likewise be effected by any well-known method, such as the addition of small amounts of pine oil and kerosene. However, other well-known substances, such as compounds of the type of xanthates, aerofloats, etc., may also be used to facilitate the flotation of the molybdenite. A better recovery of molybdenite is often obtained when it is floated from an alkaline pulp.

The following examples describe certain tests which have been made in carrying the invention into effect, the reagent proportions given in each being figured on the basis of the dry weight tonnage of the material treated.

*Example 1*

Arizona Molybdenum Corporation ore, containing as valuable minerals molybdenite, chalcopyrite, and bornite, and of a particle size to pass 10-mesh, was made up into a thick pulp with water, which pulp was ground for fifteen minutes in a ball mill with 2 lbs. per ton of lime. The material thus ground was transferred to a laboratory subaeration flotation machine where, in the state of a freely flowing pulp, it was conditioned by agitation first for five minutes with 0.2 lb. per ton of induline blue and then for two minutes with 0.1 lb. per ton of sodium ethyl xanthate and 0.25 lb. per ton of cresylic acid. Thereafter, it was treated for the production of a froth for five minutes, during which a rougher copper concentrate was floated and removed. The material remaining was conditioned for two minutes with 0.2 lb. per ton of kerosene and 0.1 lb. per ton of Hercules Yarmor pine oil, whereupon it was frothed for five minutes, during which a rougher molybdenum concentrate was floated and removed. The rougher copper concentrate was re-treated in the machine with a further 0.05 lb. per ton of sodium ethyl xanthate and a further 0.1 lb. per ton of cresylic acid, yielding a final copper concentrate, a brief conditioning period with the additional reagent amounts mentioned preceding the frothing period which was three minutes. The rougher molybdenum concentrate was agitated in the machine first for five minutes with 0.3 lb. per ton of sodium cyanide, and then for two minutes with a further 0.15 lb. per ton of kerosene and a further 0.15 lb. per ton of Hercules Yarmor pine oil. Thereafter, frothing was carried out for five minutes, during which a final molybdenum concentrate was separated. The results of the test are shown in the following table, wherein the tailings obtained by re-treatment of the rougher concentrates are each indicated as a middling:

| Product | Percent weight | Percent assays | | Percent distribution | |
|---|---|---|---|---|---|
| | | Cu | MoS₂ | Cu | MoS₂ |
| Heads | 100 | 0.569 | 1.40 | 100 | 100 |
| Rougher Cu conc | 5.00 | 10.28 | 2.32 | 90.3 | 8.3 |
| Rougher Mo conc | 2.25 | 0.80 | 54.59 | 3.2 | 87.7 |
| Tail | 92.75 | 0.04 | 0.06 | 6.5 | 4.0 |
| Finished Cu conc | 3.44 | 11.92 | 0.16 | 72.0 | 0.4 |
| Cu Midd | 1.56 | 6.68 | 7.08 | 18.3 | 7.9 |
| Finished Mo conc | 1.16 | 0.04 | 95.90 | 0.1 | 79.4 |
| Mo midd | 1.09 | 1.61 | 10.63 | 3.1 | 8.3 |

*Example 2*

Ore from the Copper Hill Mine in Arizona, crushed to pass 10-mesh, was made up into a pulp with water, which pulp was ground for ten minutes in the ball mill without any agents. Then this pulp was transferred to the flotation machine where, in a diluted state, it was agitated with 0.2 lb. per ton of Congo red, the period of agitation being five minutes. Thereafter, the pulp was further conditioned in the machine with 0.06 lb. per ton of sodium ethyl xanthate and 0.3 lb. per ton of cresylic acid, both of which reagent amounts were added in stages over an agitation period of two minutes. The conditioned pulp was then frothed for ten minutes to separate a rougher copper concentrate. With the remaining pulp were admixed 0.4 lb. per ton of kerosene and 0.3 lb. per ton of Hercules Yarmor pine oil, both reagent amounts being added in stages over an agitation period of two minutes. The resulting mixture was then frothed for ten minutes to separate a rougher molybdenum concentrate. The rougher copper concentrate was agitated for a brief period in the machine with a further 0.01 lb. per ton of sodium ethyl xanthate and a further 0.1 lb. per ton of cresylic acid, together with 0.1 lb. per ton of Hercules Yarmor pine oil, whereupon it was frothed for five minutes, yielding a final copper concentrate. The rougher molybdenum concentrate was first conditioned for five minutes with 0.5 lb. per ton of sodium cyanide, whereupon it was conditioned with a further 0.5 lb. per ton of kerosene and a further 0.2 lb. per ton of Hercules Yarmor pine oil, both reagent amounts being added in stages over a brief period of agitation. Thereafter, frothing was carried out to separate a final molybdenum concentrate. The following results were obtained, the middling products having the same significance as in the table of the preceding example:

| Product | Percent weight | Percent assays | | Percent distribution | |
|---|---|---|---|---|---|
| | | Cu | MoS₂ | Cu | MoS₂ |
| Heads | 100.0 | 1.60 | 3.28 | 100.0 | 100.0 |
| Rougher Cu conc | 12.0 | 11.79 | 1.15 | 88.3 | 4.2 |
| Rougher Mo conc | 10.0 | 1.41 | 29.47 | 8.8 | 89.9 |
| Tail | 78.0 | 0.06 | 0.25 | 2.9 | 5.9 |
| Finished Cu conc | 9.0 | 14.64 | 0.50 | 82.3 | 1.4 |
| Cu midd | 3.0 | 3.22 | 3.10 | 6.0 | 2.8 |
| Finished Mo conc | 3.4 | 0.80 | 76.60 | 1.7 | 79.4 |
| Mo midd | 6.6 | 1.72 | 5.20 | 7.1 | 10.5 |

In each of following Examples 3 to 24 inclusive, the copper and molybdenum concentrates obtained were rougher concentrates, it being understood that in practice such concentrates would be subjected to re-treatment in order to produce from them marketable products, as is shown to be possible in Examples 1 and 2.

*Example 3*

A pulp of Arizona Molybdenum Corporation ore was ground for fifteen minutes in the ball mill without any agents and thereafter transferred to the flotation machine where, in a diluted state, it was agitated for five minutes with 1 lb. per ton of aniline blue. After this mixing, the pulp was agitated for two minutes with 0.02 lb. per ton of sodium ethyl xanthate and 0.1 lb. per ton of cresylic acid, and then for two minutes more with a further 0.02 lb. per ton of sodium ethyl xanthate and a further 0.1 lb. per ton of cresylic acid. The pulp thus conditioned was then subjected to a frothing period of thirteen minutes, during which a primary concentrate (Cu conc. 1 of the following table) was floated and removed. To the remaining pulp were added 0.1 lb. per ton of kerosene and 0.1 lb. per ton of Hercules Yarmor pine oil, agitation with these agents being carried out for eight minutes, during which in stages was added 0.24 lb. per ton of sodium ethyl xanthate. Subsequently, frothing was carried out for fifteen minutes, during which another concentrate (Cu conc. 2 of the following table) was floated and removed. The remaining pulp was agitated briefly with 6 lbs. per ton of sodium carbonate; and then 0.5 lb. per ton of kerosene and 0.25 lb. per ton of Hercules Yarmor pine oil were added in stages over a further brief period of agitation. The resulting mixture was then frothed for ten minutes, during which a molybdenum concentrate was floated and removed. The results are shown in the following table:

| Product | Percent weight | Percent assays | | Percent distribution | |
|---|---|---|---|---|---|
| | | Cu | MoS₂ | Cu | MoS₂ |
| Heads | 100 | 1.25 | 1.52 | 100 | 100 |
| Cu conc. 1 | 3.01 | 26.96 | 0.7 | 64.7 | 1.4 |
| Cu conc. 2 | 4.32 | 8.40 | 1.45 | 28.9 | 4.1 |
| Mo conc. | 3.01 | 1.16 | 45.5 | 2.8 | 90.1 |
| Tail | 89.66 | 0.05 | 0.075 | 3.6 | 4.4 |

*Example 4*

In this case, the same dye was used as in Example 3, but in an alkaline circuit.

A pulp of Arizona Molybdenum Corporation ore was ground in the ball mill for fifteen minutes with 2 lbs. per ton of lime. Thereafter, in a diluted state, it was agitated in the flotation machine first for five minutes with 0.1 lb. per ton of aniline blue, and then for two minutes with 0.1 lb. per ton of sodium ethyl xanthate and 0.25 lb. per ton of cresylic acid; whereupon it was frothed for five minutes, during which a copper concentrate was floated and removed. The remaining pulp was then conditioned for two minutes with 0.2 lb. per ton of kerosene and 0.15 lb. per ton of Hercules Yarmor pine oil, whereupon it was frothed for five minutes, during which a molybdenum concentrate was floated and removed. The results were as follows:

| Product | Percent weight | Percent assays | | Percent distribution | |
|---|---|---|---|---|---|
| | | Cu | MoS₂ | Cu | MoS₂ |
| Heads | 100 | 0.613 | 1.57 | 100 | 100 |
| Cu conc. | 4.01 | 13.92 | 5.50 | 91.1 | 14.1 |
| Mo conc. | 4.11 | 0.44 | 32.04 | 2.9 | 84.0 |
| Tail | 91.88 | 0.04 | 0.032 | 6.0 | 1.9 |

*Example 5*

Here an acid circuit was used with the same dye as in Example 3.

A pulp of Arizona Molybdenum Corporation ore was ground in the ball mill for fifteen minutes without any agents, whereupon it was transferred to the flotation machine and in a diluted state conditioned for five minutes with 24.8 lbs. per ton of sulphuric acid and 0.1 lb. per ton of aniline blue. Thereafter, it was conditioned for two minutes with 0.1 lb. per ton of sodium ethyl xanthate and 0.25 lb. per ton of cresylic acid. The conditioned pulp was then subjected to a frothing period of five minutes, during which a copper concentrate was separated. With the remaining pulp were admixed 0.7 lb. per ton of kerosene and 0.4 lb. per ton of Hercules Yarmor pine oil, both of which reagent amounts were added in stages over an agitation period of four minutes. Subsequently, frothing was carried out for twelve minutes, during which a molybdenum concentrate was separated. The results were as follows:

| Product | Percent weight | Percent assays | | Percent distribution | |
|---|---|---|---|---|---|
| | | Cu | MoS₂ | Cu | MoS₂ |
| Heads | 100 | 0.588 | 1.47 | 100 | 100 |
| Cu conc. | 4.58 | 11.12 | 1.0 | 86.7 | 3.1 |
| Mo conc. | 6.71 | 0.64 | 20.87 | 7.3 | 95.1 |
| Tail | 88.71 | 0.04 | 0.029 | 6.0 | 1.8 |

*Example 6*

A pulp of Arizona Molybdenum Corporation ore was ground in the ball mill for fifteen minutes without any agents, whereupon it was transferred to the flotation machine and in a diluted state conditioned for five minutes with 24.8 lbs. per ton of sulphuric acid and 0.01 lb. per ton of eosin bluish. Thereafter, it was conditioned for two minutes with 0.1 lb. per ton of sodium ethyl xanthate and 0.25 lb. per ton of cresylic acid, and then frothed for five minutes, during which a copper concentrate was separated. The remaining pulp was conditioned with 0.3 lb. per ton of kerosene and 0.3 lb. per ton of Hercules Yarmor pine oil, both of which reagent amounts were added in stages over an agitation period of two minutes. Frothing was then carried out for five minutes, during which a molybdenum concentrate was separated. The results were as follows:

| Product | Percent weight | Percent assays | | Percent distribution | |
|---|---|---|---|---|---|
| | | Cu | MoS₂ | Cu | MoS₂ |
| Heads | 100 | 0.58 | 1.41 | 100 | 100 |
| Cu conc. | 4.96 | 11.12 | 2.8 | 94.7 | 9.8 |
| Mo conc. | 2.84 | 0.44 | 43.54 | 2.1 | 87.6 |
| Tail | 92.20 | 0.02 | 0.04 | 3.2 | 2.6 |

*Example 7*

A pulp of Arizona Molybdenum Corporation ore was ground in the ball mill for fifteen minutes with 2 lbs. per ton of lime, whereupon it was transferred to the flotation machine and in a diluted state conditioned for five minutes with 0.01 lb. per ton of eosin yellowish. Thereafter, it was conditioned for two minutes with 0.1 lb. per ton of sodium ethyl xanthate and 0.25 lb. per ton of cresylic acid, and then frothed for five minutes, during which a copper concentrate was separated. The remaining pulp was conditioned with 0.5 lb. per ton of kerosene and 0.35 lb. per ton of Hercules Yarmor pine oil, both of which reagent amounts were added in stages over an agitation period of four minutes. Frothing was then carried out for ten minutes, during which a molybdenum concentrate was separated. The results were as follows:

| Product | Percent weight | Percent assays | | Percent distribution | |
|---|---|---|---|---|---|
| | | Cu | MoS₂ | Cu | MoS₂ |
| Heads | 100 | 0.58 | 1.5 | 100 | 100 |
| Cu conc. | 4.41 | 12.08 | 3.0 | 91.9 | 8.8 |
| Mo conc. | 6.02 | 0.48 | 22.37 | 5.0 | 89.9 |
| Tail | 89.57 | 0.02 | 0.022 | 3.1 | 1.3 |

*Example 8*

A pulp of Arizona Molybdenum Corporation ore was ground in the ball mill for fifteen minutes without any agents, whereupon it was transferred to the flotation machine and in a diluted state conditioned for five minutes with 24.8 lbs. per ton of sulphuric acid and 1 lb. per ton of picric acid. Thereafter, it was conditioned for two minutes with 0.1 lb. per ton of sodium ethyl xanthate and 0.25 lb. per ton of cresylic acid, and then frothed for five minutes, during which a copper concentrate was separated. The remaining pulp was conditioned with 0.6 lb. per ton of kerosene and 0.35 lb. per ton of Hercules Yarmor pine oil, both of which reagent amounts were added in stages over an agitation period of four minutes. Frothing was then carried out for ten minutes, during which a molybdenum concentrate was separated. The results were as follows:

| Product | Percent weight | Percent assays | | Percent distribution | |
|---|---|---|---|---|---|
| | | Cu | MoS$_2$ | Cu | MoS$_2$ |
| Heads | 100 | 0.6 | 1.44 | 100 | 100 |
| Cu conc. | 5.04 | 11.16 | 3.1 | 93.6 | 10.8 |
| Mo conc. | 8.76 | 0.24 | 14.03 | 3.5 | 85.2 |
| Tail | 86.2 | 0.02 | 0.066 | 2.9 | 4.0 |

Example 9

A pulp of Arizona Molybdenum Corporation ore was ground in the ball mill for fifteen minutes with 2 lbs. per ton of lime, whereupon it was transferred to the flotation machine and in a diluted state conditioned for five minutes with 1 lb. per ton of methylene blue. Thereafter, it was conditioned for two minutes with 0.1 lb. per ton of sodium ethyl xanthate and 0.25 lb. per ton of cresylic acid, and then frothed for five minutes, during which a copper concentrate was separated. The remaining pulp was conditioned for two minutes with 0.2 lb. per ton of kerosene and 0.15 lb. per ton of Hercules Yarmor pine oil, whereupon it was frothed for five minutes, during which a molybdenum concentrate was separated. The results were as follows:

| Product | Percent weight | Percent assays | | Percent distribution | |
|---|---|---|---|---|---|
| | | Cu | MoS$_2$ | Cu | MoS$_2$ |
| Heads | 100 | 0.60 | 1.58 | 100 | 100 |
| Cu conc. | 3.41 | 15.88 | 13.10 | 90.3 | 28.2 |
| Mo conc. | 3.51 | 0.60 | 31.83 | 3.5 | 69.6 |
| Tail | 93.08 | 0.04 | 0.037 | 6.2 | 2.2 |

Example 10

A pulp of Arizona Molybdenum Corporation ore was ground in the ball mill for fifteen minutes without any agents, whereupon it was transferred to the flotation machine and in a diluted state conditioned with 0.3 lb. per ton of Erie black Gx00, added in stages over an agitation period of fifteen minutes. After this mixing, conditioning was carried out first with 0.02 lb. per ton of sodium ethyl xanthate and 0.1 lb. per ton of cresylic acid, and then with a further 0.02 lb. per ton of sodium ethyl xanthate, the total period of agitation being two minutes. The pulp thus conditioned was then subjected to a frothing period of five minutes, during which a copper concentrate was separated. The remaining pulp was conditioned with 0.3 lb. per ton of kerosene and 0.2 lb. per ton of Hercules Yarmor pine oil, both of which reagent amounts were added in stages over an agitation period of two minutes. Frothing was then carried out for seven minutes, during which a molybdenum concentrate was separated. The results were as follows:

| Product | Percent weight | Percent assays | | Percent distribution | |
|---|---|---|---|---|---|
| | | Cu | MoS$_2$ | Cu | MoS$_2$ |
| Heads | 100 | 1.164 | 1.48 | 100 | 100 |
| Cu Conc. | 4.1 | 25.12 | 4.44 | 88.5 | 12.3 |
| Mo Conc. | 2.9 | 3.34 | 42.96 | 8.3 | 84.1 |
| Tail | 93.0 | 0.04 | 0.057 | 3.2 | 3.6 |

Example 11

For the purpose of this example, the same dye was used as in Example 10, but in an alkaline circuit.

A pulp of Arizona Molybdenum Corporation ore was ground in the ball mill for fifteen minutes with 2 lbs. per ton of lime, whereupon it was transferred to the flotation machine and in a diluted state conditioned for five minutes with 0.2 lb. per ton of Erie black Gx00. Thereafter, conditioning was carried out for two minutes with 0.1 lb. per ton of sodium ethyl xanthate and 0.25 lb. per ton of cresylic acid. The pulp thus conditioned was subjected to a frothing period of five minutes, during which a copper concentrate was separated. To the remaining pulp were added 0.2 lb. per ton of kerosene and 0.15 lb. per ton of Hercules Yarmor pine oil, agitation being carried out for two minutes, during which a further 0.05 lb. per ton of Hercules Yarmor pine oil was added. The resulting mixture was then frothed for five minutes, during which a molybdenum concentrate was separated. The results were as follows:

| Product | Percent weight | Percent assays | | Percent distribution | |
|---|---|---|---|---|---|
| | | Cu | MoS$_2$ | Cu | MoS$_2$ |
| Heads | 100 | 0.594 | 1.45 | 100 | 100 |
| Cu conc. | 4.62 | 12.0 | 4.4 | 93.4 | 14.0 |
| Mo conc. | 2.71 | 0.76 | 44.76 | 3.5 | 83.6 |
| Tail | 92.67 | 0.02 | 0.037 | 3.1 | 2.4 |

Example 12

Here an acid circuit was used with the same dye as in Example 10.

A pulp of Arizona Molybdenum Corporation ore was ground in the ball mill for fifteen minutes without any agents, whereupon it was transferred to the flotation machine and in a diluted state agitated for five minutes with 33.1 lbs. per ton of sulphuric acid and 0.1 lb. per ton of Erie black Gx00. A further 0.1 lb. per ton of Erie black Gx00 was then added and agitation continued for five minutes more, whereupon conditioning was carried out for two minutes with 0.02 lb. per ton of sodium ethyl xanthate and 0.1 lb. per ton of cresylic acid. The pulp thus conditioned was subjected to a frothing period of five minutes, during which a copper concentrate was separated. The remaining pulp was conditioned with 0.4 lb. per ton of kerosene and 0.25 lb. per ton of Hercules Yarmor pine oil, both reagent amounts being added in stages over an agitation period of two minutes. Frothing was then carried out for ten minutes, during which a molybdenum concentrate was separated. The results were as follows

| Product | Percent weight | Percent assays | | Percent distribution | |
|---|---|---|---|---|---|
| | | Cu | MoS₂ | Cu | MoS₂ |
| Heads | 100 | 1.16 | 1.46 | 100 | 100 |
| Cu conc | 3.76 | 27.44 | 6.48 | 88.8 | 16.7 |
| Mo conc | 3.04 | 3.65 | 37.8 | 9.6 | 78.8 |
| Tail | 93.20 | 0.02 | 0.07 | 1.6 | 4.5 |

*Example 13*

A pulp of Arizona Molybdenum Corporation ore was ground in the ball mill for fifteen minutes without any agents, whereupon it was transferred to the flotation machine and in a diluted state conditioned with 0.8 lb. per ton of Wool green S, added in stages over an agitation period of fifteen minutes. Thereafter, it was conditioned with 0.04 lb. per ton of sodium ethyl xanthate and 0.15 lb. per ton of cresylic acid, both of which reagent amounts were added in stages over an agitation period of two minutes. The pulp thus conditioned was subjected to a frothing period of five minutes, during which a copper concentrate was separated. The remaining pulp was conditioned with 0.3 lb. per ton of kerosene and 0.15 lb. per ton of Hercules Yarmor pine oil, both of which reagent amounts were added in stages over an agitation period of two minutes. Frothing was then carried out for ten minutes, during which a molybdenum concentrate was separated. The results were as follows:

| Product | Percent weight | Percent assays | | Percent distribution | |
|---|---|---|---|---|---|
| | | Cu | MoS₂ | Cu | MoS₂ |
| Heads | 100 | 1.22 | 1.52 | 100 | 100 |
| Cu conc | 3.77 | 25.60 | 5.90 | 79.0 | 14.7 |
| Mo conc | 3.46 | 5.80 | 36.54 | 16.4 | 83.2 |
| Tail | 92.77 | 0.06 | 0.035 | 4.6 | 2.1 |

*Example 14*

A pulp of Arizona Molybdenum Corporation ore was ground in the ball mill for fifteen minutes without any agents, whereupon it was transferred to the flotation machine and in a diluted state conditioned for five minutes with 0.1 lb. per ton of acid green. Thereafter, conditioning was carried out with 0.04 lb. per ton of sodium ethyl xanthate and 0.15 lb. per ton of cresylic acid, both of which reagent amounts were added in stages over an agitation period of two minutes. The pulp thus conditioned was subjected to a frothing period of seven minutes, during which a copper concentrate was separated. To the remaining pulp were added 0.2 lb. per ton of kerosene and 0.1 lb. per ton of Hercules Yarmor pine oil, agitation being carried out for two minutes, during which a further 0.05 lb. per ton of Hercules Yarmor pine oil was added. The resulting mixture was then frothed for seven minutes during which a molybdenum concentrate was separated. The results were as follows:

| Product | Percent weight | Percent assays | | Percent distribution | |
|---|---|---|---|---|---|
| | | Cu | MoS₂ | Cu | MoS₂ |
| Heads | 100 | 1.17 | 1.44 | 100 | 100 |
| Cu conc | 4.83 | 22.16 | 6.0 | 91.7 | 20.2 |
| Mo conc | 2.21 | 3.56 | 50.2 | 6.7 | 77.4 |
| Tail | 92.96 | 0.02 | 0.036 | 1.6 | 2.4 |

*Example 15*

A pulp of Arizona Molybdenum Corporation ore was ground in the ball mill for fifteen minutes without any agents, whereupon it was transferred to the flotation machine and in a diluted state conditioned for five minutes with 1 lb. per ton of acid orange. Thereafter, it was conditioned for two minutes with 0.04 lb. per ton of sodium ethyl xanthate and 0.1 lb. per ton of cresylic acid, whereupon frothing was carried out for five minutes, during which a copper concentrate was separated. The remaining pulp was agitated for two minutes with 0.3 lb. per ton of kerosene and 0.1 lb. per ton of Hercules Yarmor pine oil, whereupon a froth was removed for about five minutes. The remaining pulp was then further conditioned for two minutes with 0.1 lb. per ton of sodium ethyl xanthate, 0.1 lb. per ton of kerosene, 0.05 lb. per ton of Hercules Yarmor pine oil, and 6 lbs. per ton of sodium carbonate, the pulp being rendered alkaline by the addition of the sodium carbonate. Frothing was then resumed, a molybdenum concentrate being separated over a total period of froth removal of ten minutes. The results were as follows:

| Product | Percent weight | Percent assays | | Percent distribution | |
|---|---|---|---|---|---|
| | | Cu | MoS₂ | Cu | MoS₂ |
| Heads | 100 | 1.246 | 1.55 | 100 | 100 |
| Cu conc | 4.65 | 25.28 | 8.8 | 94.3 | 26.4 |
| Mo conc | 3.54 | 1.48 | 31.1 | 4.2 | 71.1 |
| Tail | 91.81 | 0.02 | 0.042 | 1.5 | 2.5 |

*Example 16*

A pulp of Arizona Molybdenum Corporation ore was ground in the ball mill for fifteen minutes without any agents, whereupon it was transferred to the flotation machine and in a diluted state conditioned for five minutes with 1 lb. per ton of Hoffman violet. Thereafter, it was conditioned with 0.06 lb. per ton of sodium ethyl xanthate and 0.2 lb. per ton of cresylic acid, both reagent amounts being added in stages over an agitation period of two minutes. The pulp thus conditioned was frothed for five minutes, during which a copper concentrate was separated. The remaining pulp was conditioned for two minutes with 0.2 lb. per ton of kerosene and 0.2 lb. per ton of Hercules Yarmor pine oil, whereupon it was frothed for seven minutes, during which a molybdenum concentrate was separated. The results were as follows:

| Product | Percent weight | Percent assays | | Percent distribution | |
|---|---|---|---|---|---|
| | | Cu | MoS₂ | Cu | MoS₂ |
| Heads | 100 | 1.19 | 1.44 | 100 | 100 |
| Cu conc | 4.51 | 25.36 | 9.9 | 95.8 | 30.9 |
| Mo conc | 2.80 | 1.12 | 34.3 | 2.6 | 66.6 |
| Tail | 92.69 | 0.02 | 0.0363 | 1.6 | 2.5 |

Example 17

A pulp of Arizona Molybdenum Corporation ore was ground in the ball mill for fifteen minutes without any agents, whereupon it was transferred to the flotation machine and in a diluted state conditioned for five minutes with 0.1 lb. per ton of acid blue. Thereafter, conditioning was carried out with 0.08 lb. per ton of sodium ethyl xanthate and 0.2 lb. per ton of cresylic acid, both of which reagent amounts were added in stages over an agitation period of two minutes. The pulp thus conditioned was frothed for five minutes, during which a copper concentrate was separated. To the remaining pulp were added 0.2 lb. per ton of kerosene and 0.1 lb. per ton of Hercules Yarmor pine oil, agitation being carried out for two minutes, during which was added a further 0.1 lb. per ton of Hercules Yarmor pine oil. Frothing was then carried out for seven minutes, during which a molybdenum concentrate was separated. The results were as follows:

| Product | Percent weight | Percent assays | | Percent distribution | |
|---|---|---|---|---|---|
| | | Cu | MoS$_2$ | Cu | MoS$_2$ |
| Heads | 100 | 1.21 | 1.35 | 100 | 100 |
| Cu conc | 4.44 | 23.36 | 9.32 | 85.8 | 30.7 |
| Mo conc | 2.62 | 4.44 | 33.4 | 9.6 | 64.9 |
| Tail | 92.94 | 0.06 | 0.063 | 4.6 | 4.4 |

Example 18

A pulp of Arizona Molybdenum Corporation ore was ground in the ball mill for fifteen minutes without any agents, whereupon it was transferred to the flotation machine and in a diluted state conditioned with 0.3 lb. per ton of acid orange A, added in stages over an agitation period of fifteen minutes. Thereafter, 0.02 lb. per ton of sodium ethyl xanthate and 0.1 lb. per ton of cresylic acid were added to the pulp, agitation being carried out for two minutes, during which was added a further 0.02 lb. per ton of sodium ethyl xanthate. The pulp thus conditioned was subjected to a frothing period of five minutes, during which a copper concentrate was separated. To the remaining pulp were added 0.2 lb. per ton of kerosene and 0.1 lb. per ton of Hercules Yarmor pine oil, agitation being carried out for two minutes, during which was added a further 0.05 lb. per ton of Hercules Yarmor pine oil. Frothing was then carried out for seven minutes, during which a molybdenum concentrate was separated. The results were as follows:

| Product | Percent weight | Percent assays | | Percent distribution | |
|---|---|---|---|---|---|
| | | Cu | MoS$_2$ | Cu | MoS$_2$ |
| Heads | 100 | 1.20 | 1.41 | 100 | 100 |
| Cu conc | 4.1 | 25.36 | 11.25 | 86.7 | 32.8 |
| Mo conc | 2.7 | 3.75 | 33.25 | 8.5 | 63.9 |
| Tail | 93.2 | 0.062 | 0.05 | 4.8 | 3.3 |

Example 19

A pulp of Arizona Molybdenum Corporation ore was ground in the ball mill for fifteen minutes with 2 lbs. per ton of lime, whereupon it was transferred to the flotation machine and in a diluted state conditioned for five minutes with 0.3 lb. per ton of indigotine. Thereafter, it was conditioned for two minutes with 0.1 lb. per ton of sodium ethyl xanthate and 0.25 lb. per ton of cresylic acid, and then frothed for five minutes, during which a copper concentrate was separated. To the remaining pulp were added 0.2 lb. per ton of kerosene and 0.15 lb. per ton of Hercules Yarmor pine oil, agitation being carried out for two minutes, during which was added a further 0.05 lb. per ton of Hercules Yarmor pine oil. Frothing was then carried out for five minutes, during which a molybdenum concentrate was separated. The results were as follows:

| Product | Percent weight | Percent assays | | Percent distribution | |
|---|---|---|---|---|---|
| | | Cu | MoS$_2$ | Cu | MoS$_2$ |
| Heads | 100 | 0.608 | 1.49 | 100 | 100 |
| Cu conc | 4.81 | 11.36 | 6.00 | 89.8 | 19.3 |
| Mo conc | 2.51 | 1.00 | 46.65 | 4.1 | 78.5 |
| Tail | 92.68 | 0.04 | 0.035 | 5.1 | 2.2 |

Comparative Test 1

This test was carried out on the same ore as in Examples 3 to 19 inclusive, following procedures similar to those indicated in those examples, except that no dye was employed.

A pulp of Arizona Molybdenum Corporation ore was ground in the ball mill for fifteen minutes without any agents. Thereafter, in a diluted state, it was conditioned in the flotation machine with 0.04 lb. per ton of sodium ethyl xanthate and 0.15 lb. per ton of cresylic acid, both of which reagent amounts were added in stages over an agitation period of two minutes. The pulp was then frothed for five minutes, during which a primary concentrate (conc. 1 of the table) was separated. To the remaining pulp were added 0.2 lb. per ton of kerosene and 0.1 lb. per ton of Hercules Yarmor pine oil, agitation being carried out for two minutes, during which was added a further 0.1 lb. per ton of Hercules Yarmor pine oil. Frothing was then carried out for seven minutes, during which another concentrate (conc. 2 of the table) was separated. The results are shown in the following table, from which it is apparent that most of the molybdenite was floated during the first operation of concentrating the copper sulphides:

| Product | Percent weight | Percent assays | | Percent distribution | |
|---|---|---|---|---|---|
| | | Cu | MoS$_2$ | Cu | MoS$_2$ |
| Heads | 100 | 1.17 | 1.49 | 100 | 100 |
| Conc. 1 | 5.72 | 18.84 | 23.88 | 92.3 | 91.9 |
| Conc. 2 | 1.71 | 3.08 | 5.0 | 4.5 | 5.8 |
| Tail | 92.57 | 0.04 | 0.037 | 3.2 | 2.3 |

Example 20

Utah Copper Company ore, containing chalcocite as one of the valuable minerals, and of particle size to pass 10-mesh, was made up into a pulp with water, which pulp was ground in the ball mill for ten minutes with 2.5 lbs. per ton of lime and thereafter conditioned in the flotation machine for five minutes with 0.5 lb. per ton of Congo red. Subsequently, conditioning was carried out for two minutes with 0.02 lb. per ton of sodium ethyl xanthate and 0.25 lb. per ton of cresylic acid, whereupon frothing was carried out for six minutes, during which a copper concentrate was separated. The remaining pulp was conditioned for two minutes with 0.04 lb.

per ton of sodium ethyl xanthate, 0.2 lb. per ton of kerosene, and 0.2 lb. per ton of Hercules Yarmor pine oil, whereupon it was frothed for seven minutes, during which a molybdenum concentrate was separated. The results were as follows:

| Product | Percent weight | Percent assays | | Percent distribution | |
|---|---|---|---|---|---|
| | | Cu | MoS₂ | Cu | MoS₂ |
| Heads | 100 | 0.954 | 0.091 | 100 | 100 |
| Cu conc | 3.4 | 25.32 | 0.40 | 90.2 | 15.0 |
| Mo conc | 1.9 | 2.92 | 3.43 | 5.8 | 71.8 |
| Tail | 94.7 | 0.04 | 0.0127 | 4.0 | 13.2 |

Example 21

A pulp of Utah Copper Company ore was ground in the ball mill for ten minutes with 2.5 lbs. per ton of lime, whereupon it was transferred to the flotation machine and in a diluted state conditioned for five minutes with 0.25 lb. per ton of induline blue. Thereafter, it was conditioned for two minutes with 0.02 lb. per ton of sodium ethyl xanthate and 0.25 lb. per ton of cresylic acid, and then frothed for five minutes, during which a copper concentrate was separated. The remaining pulp was conditioned for two minutes with 0.02 lb. per ton of sodium ethyl xanthate, 0.2 lb. per ton of kerosene, and 0.2 lb. per ton of Hercules Yarmor pine oil, whereupon it was frothed for seven minutes, during which a molybdenum concentrate was separated. The results were as follows:

| Product | Percent weight | Percent assays | | Percent distribution | |
|---|---|---|---|---|---|
| | | Cu | MoS₂ | Cu | MoS₂ |
| Heads | 100 | 0.938 | 0.085 | 100 | 100 |
| Cu conc | 2.91 | 27.92 | 0.38 | 86.6 | 13.0 |
| Mo conc | 1.71 | 5.12 | 3.33 | 9.3 | 66.9 |
| Tail | 95.38 | 0.04 | 0.018 | 4.1 | 20.1 |

Example 22

A pulp of Utah Copper Company ore was ground in the ball mill for ten minutes with 2.5 lbs. per ton of lime, whereupon it was transferred to the flotation machine and in a diluted state conditioned for five minutes with 0.05 lb. per ton of eosin bluish. Thereafter, it was conditioned for two minutes with 0.02 lb. per ton of sodium ethyl xanthate and 0.25 lb. per ton of cresylic acid, and then frothed for six minutes, during which a copper concentrate was separated. The remaining pulp was conditioned for two minutes with 0.04 lb. per ton of sodium ethyl xanthate, 0.2 lb. per ton of kerosene, and 0.2 lb. per ton of Hercules Yarmor pine oil, whereupon it was frothed for seven minutes, during which a molybdenum concentrate was separated. The results were as follows:

| Product | Percent weight | Percent assays | | Percent distribution | |
|---|---|---|---|---|---|
| | | Cu | MoS₂ | Cu | MoS₂ |
| Heads | 100 | 0.928 | 0.083 | 100 | 100 |
| Cu conc | 3.2 | 26.72 | 0.525 | 92.1 | 20.3 |
| Mo conc | 1.0 | 3.48 | 4.50 | 3.8 | 54.3 |
| Tail | 95.8 | 0.04 | 0.022 | 4.1 | 25.4 |

Example 23

A pulp of Utah Copper Company ore was ground in the ball mill for ten minutes with 2.5 lbs. per ton of lime, whereupon it was transferred to the flotation machine and in a diluted state conditioned for five minutes with 0.05 lb. per ton of eosin yellowish. Thereafter, it was conditioned for two minutes with 0.02 lb. per ton of sodium ethyl xanthate and 0.25 lb. per ton of cresylic acid, and then frothed for six minutes, during which a copper concentrate was separated. The remaining pulp was conditioned for two minutes with 0.04 lb. per ton of sodium ethyl xanthate, 0.2 lb. per ton of kerosene, and 0.2 lb. per ton of Hercules Yarmor pine oil, whereupon it was frothed for seven minutes, during which a molybdenum concentrate was separated. The results were as follows:

| Product | Percent weight | Percent assays | | Percent distribution | |
|---|---|---|---|---|---|
| | | Cu | MoS₂ | Cu | MoS₂ |
| Heads | 100 | 0.966 | 0.084 | 100 | 100 |
| Cu conc | 3.21 | 27.36 | 0.506 | 90.9 | 19.4 |
| Mo conc | 1.35 | 3.72 | 3.43 | 5.2 | 55.4 |
| Tail | 95.44 | 0.04 | 0.022 | 3.9 | 25.2 |

Comparative Test 2

No dye was employed in this test, the procedures of which were otherwise similar to those indicated in Examples 20 to 23 inclusive, the same ore being employed.

A pulp of Utah Copper Company ore was ground in the ball mill for ten minutes with 2.5 lbs. per ton of lime. Thereafter, in a diluted state, it was conditioned in the flotation machine for two minutes with 0.02 lb. per ton of sodium ethyl xanthate and 0.25 lb. per ton of cresylic acid, whereupon it was frothed for six minutes, during which a primary concentrate (conc. 1 of the table) was separated. The remaining pulp was conditioned for two minutes with 0.04 lb. per ton of sodium ethyl xanthate, 0.2 lb. per ton of kerosene, and 0.2 lb. per ton of Hercules Yarmor pine oil, and was then frothed for seven minutes, during which another concentrate (conc. 2 of the table) was separated. The results were as follows:

| Product | Percent weight | Percent assays | | Percent distribution | |
|---|---|---|---|---|---|
| | | Cu | MoS₂ | Cu | MoS₂ |
| Heads | 100 | 0.908 | 0.085 | 100 | 100 |
| Conc. 1 | 3.41 | 24.43 | 1.66 | 91.9 | 66.9 |
| Conc. 2 | 0.90 | 3.88 | 0.84 | 3.9 | 9.0 |
| Tail | 95.69 | 0.04 | 0.0213 | 4.2 | 24.1 |

Example 24

A pulp of Copper Hill Mine ore was ground in the ball mill for ten minutes without any agents, whereupon in a diluted state it was conditioned in the flotation machine for five minutes with 0.02 lb. per ton of eosin yellowish. Thereafter, conditioning was carried out with 0.06 lb. per ton of sodium ethyl xanthate and 0.3 lb. per ton of cresylic acid, both of which reagent amounts were added in stages over an agitation period of two minutes. The pulp thus conditioned was subjected to a frothing period of ten minutes, during which a copper concentrate was separated. The remaining pulp was conditioned with 0.5 lb. per ton of kerosene and 0.2 lb. per ton of Hercules Yarmor pine oil, both reagent amounts being added in stages over an agitation period of two minutes. Frothing was then carried out for ten minutes, during which a molybdenum concentrate was separated. The results were as follows:

| Product | Percent weight | Percent assays | | Percent distribution | |
|---|---|---|---|---|---|
| | | Cu | MoS₂ | Cu | MoS₂ |
| Heads | 100 | 1.66 | 3.4 | 100 | 100 |
| Cu conc | 12.8 | 12.24 | 4.9 | 94.5 | 18.4 |
| Mo conc | 8.8 | 0.68 | 30.4 | 3.6 | 78.8 |
| Tail | 78.4 | 0.04 | 0.12 | 1.9 | 2.8 |

*Comparative Test 3*

The same ore was employed as in Example 24, the procedures followed being similar to those indicated in that example, except that no dye was used.

A pulp of Copper Hill Mine ore was ground in the ball mill for eight minutes without any agents. Thereafter, in a diluted state, it was conditioned in the flotation machine for two minutes with 0.04 lb. per ton of sodium ethyl xanthate and 0.2 lb. per ton of cresylic acid, whereupon it was frothed for five minutes, during which a primary concentrate (conc. 1 of the table) was separated. The remaining pulp was conditioned for two minutes with 0.2 lb. per ton of kerosene and 0.2 lb. per ton of Hercules Yarmor pine oil, and was then frothed for five minutes, during which another concentrate (conc. 2 of the table) was separated. The results were as follows:

| Product | Percent weight | Percent assays | | Percent distribution | |
|---|---|---|---|---|---|
| | | Cu | MoS₂ | Cu | MoS₂ |
| Heads | 100 | 1.65 | 3.07 | 100 | 100 |
| Conc. 1 | 14.66 | 10.72 | 19.8 | 95.4 | 94.5 |
| Conc. 2 | 3.67 | 1.6 | 2.6 | 3.6 | 3.1 |
| Tail | 81.67 | 0.02 | 0.09 | 1.0 | 2.4 |

*Example 25*

Three charges of Arizona Molybdenum Corporation ore, each containing 1000 grams of dry solids, were separately ground for fifteen minutes in the ball mill with 4 lbs. per ton of sodium carbonate. Each charge was then individually treated to yield a rougher mixed concentrate of copper and molybdenum. For this purpose, with each charge, properly diluted in the flotation machine, were admixed by agitation first 0.1 lb. per ton of sodium ethyl xanthate and 0.25 lb. per ton of cresylic acid and then a further 0.1 lb. per ton of cresylic acid, the total period of agitation being two minutes. Each charge thus conditioned was frothed and the froth removed over a period of five minutes, the tailing in each instance being removed from the machine. Like products from the three charges were combined, the product termed "Rougher tail." in the table below having reference to the combined tailings. The combined concentrates were reagitated in the machine first for three minutes with a further 0.17 lb. per ton of sodium carbonate, together with 0.05 lb. per ton of sodium cyanide, and then for a brief period with a further 0.02 lb. per ton of sodium ethyl xanthate and a further 0.05 lb. per ton of cresylic acid, together with 0.017 lb. per ton of Hercules Yarmor pine oil, whereupon frothing was carried out for five minutes, during which a finished concentrate of copper and molybdenum was separated, the tailing remaining being designated as a middling of iron and insolubles in the table below. This tailing was removed from the machine and the concentrate replaced therein, where it was conditioned for five minutes with 0.034 lb. per ton of Congo red. Thereafter, in stages were added, over an agitation period of three minutes, 0.068 lb. per ton of sodium ethyl xanthate, 0.068 lb. per ton of cresylic acid, and 0.051 lb. per ton of potassium pentasol xanthate whereupon frothing was carried out for five minutes, during which a concentrate of copper (conc. 1 of the table) was separated. The material remaining was reagitated for one minute with a further 0.034 lb. per ton of potassium pentasol xanthate, together with 0.017 lb. per ton of Hercules Yarmor pine oil, and then frothed for five minutes, during which another concentrate (conc. 2 of the table) was separated. The latter concentrate constituted a middling of copper and molybdenum, the resulting tailing constituting the molybdenum concentrate (final tail of the table). The results of the test were as follows:

| Product | Percent weight | Percent assays | | Percent distribution | |
|---|---|---|---|---|---|
| | | Cu | MoS₂ | Cu | MoS₂ |
| Heads | 100 | 0.535 | 1.45 | 100 | 100 |
| Rougher tail | 93.51 | 0.06 | 0.076 | 10.5 | 4.9 |
| Fe and Ins. midd | 3.62 | 0.74 | 2.58 | 5.0 | 6.4 |
| Conc. 1 (Cu) | 1.52 | 28.80 | 0.52 | 81.9 | 0.6 |
| Conc. 2 (Cu and Mo) | 0.29 | 2.24 | 91.10 | 1.2 | 18.2 |
| Final tail (Mo conc.) | 1.06 | 0.72 | 95.70 | 1.4 | 69.9 |
| Conc. 2—final tail | 1.35 | 1.05 | 94.70 | 2.6 | 88.1 |

*Example 26*

Three charges of Arizona Molybdenum Corporation ore, each of 1000 grams (dry weight), were separately ground in the ball mill for fifteen minutes with 4 lbs. per ton of sodium carbonate. With each charge, properly diluted in the flotation machine, were admixed 0.1 lb. per ton of sodium ethyl xanthate, 0.25 lb. per ton of cresylic acid, and 0.05 lb. per ton of Hercules Yarmor pine oil, the period of agitation being two minutes, during which a further 0.1 lb. per ton of cresylic acid was added. Each charge thus conditioned was frothed for five minutes, during which a rougher concentrate of copper and molybdenum was separated, the tailing in each instance being removed from the machine. The three rougher concentrates thus obtained were combined and agitated in the machine first for three minutes with a further 0.17 lb. per ton of sodium carbonate, together with 0.05 lb. per ton of sodium cyanide, and then for a brief period with a further 0.034 lb. per ton of cresylic acid, together with 0.01 lb. per ton of potassium pentasol xanthate, whereupon frothing was carried out for five minutes during which a finished concentrate of copper and molybdenum was separated. This concentrate, upon removal of the tailing, was returned to the machine and agitated for five minutes with 0.017 lb. per ton of eosin yellowish, subsequent to which it was frothed for three minutes, yielding a concentrate of copper (conc. 1 of the table). The material remaining was agitated for a brief period with 0.034 lb. per ton of potassium pentasol xanthate and 0.034 lb. per ton of cresylic acid, and then frothed for three minutes, yielding another concentrate (conc. 2 of the table), constituting a middling of copper and molybdenum, the tailing of this last operation constituting the molybdenum concentrate (final tail of the table). The results are shown in the following table, wherein the product termed "Rougher tail." and the product termed "Fe and Ins. midd." have the same significance as in the table of the preceding example:

| Product | Percent weight | Percent assays | | Percent distribution | |
|---|---|---|---|---|---|
|  |  | Cu | MoS$_2$ | Cu | MoS$_2$ |
| Heads | 100 | 0.543 | 1.50 | 100 | 100 |
| Rougher tail | 93.19 | 0.04 | 0.052 | 6.9 | 3.2 |
| Fe and Ins. midd | 3.11 | 1.82 | 2.19 | 10.4 | 4.5 |
| Conc. 1 (Cu) | 1.98 | 18.96 | 1.44 | 69.1 | 1.9 |
| Conc. 2 (Cu and Mo) | 1.00 | 6.36 | 69.70 | 11.7 | 46.4 |
| Final tail. (Mo conc.) | 0.72 | 1.42 | 91.9 | 1.9 | 44.0 |

*Example 27*

Two charges of Arizona Molybdenum Corporation ore, each of 1000 grams (dry weight), were separately ground in the ball mill for fifteen minutes with 2 lbs. per ton of lime. Each charge, properly diluted in the flotation machine, was agitated first for five minutes with 0.5 lb. per ton of Erie black, and then for two minutes with 0.1 lb. per ton of sodium ethyl xanthate, 0.05 lb. per ton of potassium pentasol xanthate, and 0.25 lb. per ton of cresylic acid. Each charge thus conditioned was frothed for five minutes, during which a rougher copper concentrate was separated. The remaining portion of each charge was conditioned with 0.4 lb. per ton of kerosene and 0.2 lb. per ton of Hercules Yarmor pine oil, both of which reagent amounts were added in stages over an agitation period of four minutes, frothing thereafter being carried out for eight minutes, during which a rougher molybdenum concentrate was separated. The combined rougher concentrates of copper were retreated in the machine with a further 0.05 lb. per ton of sodium ethyl xanthate and a further 0.1 lb. per ton of cresylic acid, yielding a final copper concentrate, a brief conditioning period with the additional reagent amounts mentioned preceding the frothing period, which was three minutes. The combined rougher concentrates of molybdenum were agitated in the machine first for five minutes with 0.3 lb. per ton of sodium cyanide, and then for two minutes with a further 0.1 lb. per ton of kerosene and a further 0.1 lb. per ton of Hercules Yarmor pine oil, whereupon frothing was carried out for five minutes, yielding a final molybdenum concentrate. The results are shown in the following table, the product termed "Cu midd." having reference to the tailing obtained by re-treatment of the mixed rougher concentrates of copper and the product termed "Mo midd." to the tailing obtained by re-treatment of the mixed rougher concentrates of molybdenum:

| Product | Percent weight | Percent assays | | Percent distribution | |
|---|---|---|---|---|---|
|  |  | Cu | MoS$_2$ | Cu | MoS$_2$ |
| Heads | 100 | 0.594 | 1.53 | 100 | 100 |
| Rougher Cu concs | 5.08 | 9.94 | 1.62 | 85.0 | 5.4 |
| Rougher Mo concs | 4.84 | 1.09 | 29.00 | 8.9 | 91.8 |
| Tail | 90.08 | 0.04 | 0.047 | 6.1 | 2.8 |
| Finished Cu conc | 2.59 | 16.40 | 0.15 | 71.5 | 0.3 |
| Cu midd | 2.49 | 3.22 | 3.16 | 13.5 | 5.1 |
| Finished Mo conc | 1.08 | 0.38 | 94.20 | 0.7 | 66.5 |
| Mo midd | 3.76 | 1.30 | 10.30 | 8.2 | 25.3 |

None of the detailed procedures described in the examples should be interpreted as limiting the invention, these procedures being capable of being modified in many ways without departing from its spirit.

In the claims, the term "copper sulphide" is to be interpreted as referring to either one or a plurality of copper sulphide minerals.

What is claimed is:

1. A process of ore concentration by flotation for the separation of molybdenite from copper sulphide, which consists in agitating a pulp of the material containing molybdenite and copper sulphide at a suitable pH value in the presence of a dye to selectively inhibit flotation of molybdenite, and producing a flotation concentrate containing copper sulphide.

2. A process of ore concentration by flotation for the separation of molybdenite from copper sulphide, which consists in agitating a pulp of the material containing molybdenite and copper sulphide at a suitable pH value in the presence of a dye and lime to selectively inhibit flotation of molybdenite, and producing a flotation concentrate containing copper sulphide.

3. A process of concentrating an ore containing molybdenite and copper sulphide by flotation, which consists in agitating a pulp of the suitably ground ore containing molybdenite and copper sulphide at a suitable pH value in the presence of a dye to selectively inhibit flotation of molybdenite, treating the pulp so as to produce a flotation concentrate containing copper sulphide, and treating the remaining pulp so as to produce a flotation concentrate containing molybdenite.

4. A process of concentrating an ore containing molybdenite and copper sulphide by flotation, which consists in agitating a pulp of the suitably ground ore containing molybdenite and copper sulphide at a suitable pH value in the presence of a dye to selectively inhibit flotation of molybdenite, treating the pulp so as to produce a flotation concentrate containing copper sulphide, and treating the remaining pulp in an alkaline state so as to produce a flotation concentrate containing molybdenite.

5. A process of concentrating an ore containing molybdenite and copper sulphide by flotation, which consists in agitating a pulp of the suitably ground ore containing molybdenite and copper sulphide at a suitable pH value in the presence of a dye to selectively inhibit flotation of molybdenite, treating the pulp so as to produce a flotation concentrate containing copper sulphide, and agitating the remaining pulp with a mineral hydrocarbon oil and a frothing agent obtained by the distillation of pine wood so as to produce a flotation concentrate containing molybdenite.

6. A process of concentrating an ore containing molybdenite and copper sulphide by flotation, which consists in agitating a pulp of the suitably ground ore containing molybdenite and copper sulphide at a suitable pH value in the presence of a dye to selectively inhibit flotation of molybdenite, treating the pulp so as to produce a flotation concentrate containing copper sulphide, and agitating the remaining pulp with kerosene and pine oil so as to produce a flotation concentrate containing molybdenite.

7. A process of concentrating an ore containing molybdenite and copper sulphide, which consists in treating a pulp of the suitably ground ore containing molybdenite and copper sulphide so as to produce a primary concentrate consisting mainly of molybdenite and copper sulphide, agitating a pulp of the primary concentrate at a suitable pH value with a dye and flotation agents so as to produce a floating froth relatively poor in molybdenite and relatively rich in copper sulphide, and removing the froth.

8. A process of concentrating an ore containing molybdenite and copper sulphide, which consists in grinding the ore containing molybdenite and copper sulphide with lime, adding water to the ground ore to form a freely flowing pulp, agitating the pulp at a suitable pH value with a dye and flotation agents so as to produce a floating froth relatively poor in molybdenite and relatively rich in copper sulphide, removing the froth, and treating the remaining pulp so as to recover molybdenite in a second floating froth.

9. A process of concentrating an ore containing molybdenite and copper sulphide, which consists in grinding the ore containing molybdenite and copper sulphide with lime, adding water to the ground ore to form a freely flowing pulp, agitating the pulp at a suitable pH value with a dye and flotation agents so as to produce a floating froth relatively poor in molybdenite and relatively rich in copper sulphide, removing the froth, and agitating the remaining pulp with kerosene and pine oil so as to produce a flotation concentrate containing molybdenite.

10. A process of concentration by flotation for the separation of molybdenite from copper sulphide, which consists in agitating a pulp of the material containing molybdenite and copper sulphide at a suitable pH value in the presence of Congo red to selectively inhibit flotation of molybdenite, and producing a flotation concentrate containing copper sulphide.

11. A process of concentration by flotation for the separation of molybdenite from copper sulphide, which consists in agitating a pulp of the material containing molybdenite and copper sulphide at a suitable pH value in the presence of aniline blue to selectively inhibit flotation of molybdenite, and producing a flotation concentrate containing copper sulphide.

12. A process of concentration by flotation for the separation of molybdenite from copper sulphide, which consists in agitating a pulp of the material containing molybdenite and copper sulphide at a suitable pH value in the presence of induline blue to selectively inhibit flotation of molybdenite, and producing a flotation concentrate containing copper sulphide.

13. A process of ore concentration by flotation for the separation of molybdenite from chalcocite, which consists in agitating a pulp of the suitably ground material containing molybdenite and chalcocite in the presence of a dye to selectively inhibit flotation of molybdenite, and producing a flotation concentrate containing chalcocite.

EARL HENRY BROWN.